Sept. 1, 1925.  L. BLACKMORE  1,552,264

BUMPER

Filed Dec. 22, 1923

Inventor

Lloyd Blackmore.

Patented Sept. 1, 1925.

1,552,264

UNITED STATES PATENT OFFICE.

LLOYD BLACKMORE, OF HIGHLAND PARK, MICHIGAN, ASSIGNOR TO GENERAL MOTORS CORPORATION, OF DETROIT, MICHIGAN, A CORPORATION OF DELAWARE.

BUMPER.

Application filed December 22, 1922. Serial No. 682,317.

*To all whom it may concern:*

Be it known that I, LLOYD BLACKMORE, a citizen of the United States, and a resident of Highland Park, county of Wayne, and State of Michigan, have invented certain new and useful Improvements in Bumpers, of which the following is a full, clear, concise, and exact description, such as will enable others skilled in the art to which the invention relates to make and use the same, reference being made therein to the accompanying drawings, which form a part of this specification.

This invention relates to rear quarter bumpers, and is illustrated as embodied in an automobile chassis having a pair of such bumpers supported in a novel manner in position to protect the usual side fenders.

An object of the invention is to provide a simple support which will hold a bumper of this character securely in place, while permitting the maximum resilient yielding which is consistent with complete protection for the fender.

From this point of view, the invention contemplates supporting at each side of the car an impact bar, or impact bars, at one end on a rigid, unyielding bracket which serves as a fixed fulcrum, and at the other end on a resilient support which can yield to a limited extent and which may be secured to the corresponding side member of the chassis frame. The rigid brackets may, if desired, be continuations of the side chassis frame members, either integral therewith or securely attached thereto.

The above and other objects and features of the invention, including various desirable particular constructions, will be apparent from the following description of the illustrative embodiment shown in the accompanying drawings, in which—

Figure 1:
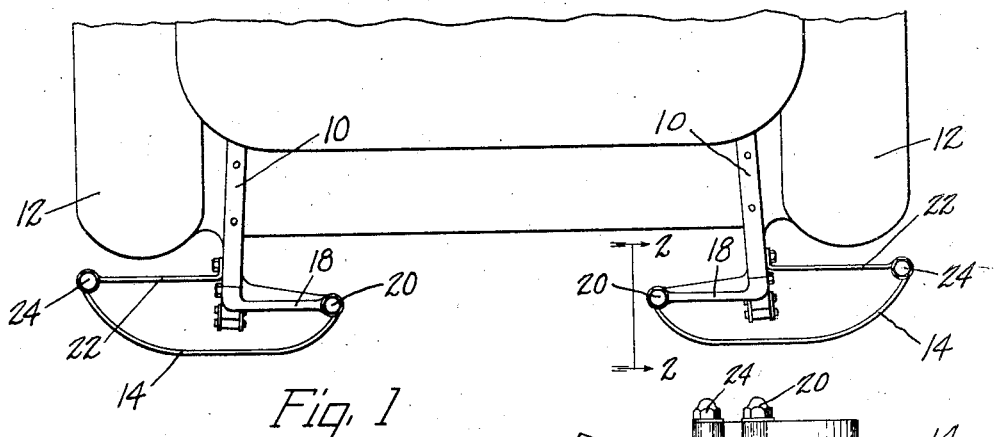
Fig. 1 is a top plan view of the rear end of an automobile chassis equipped with the described quarter bumpers.
Figure 2:
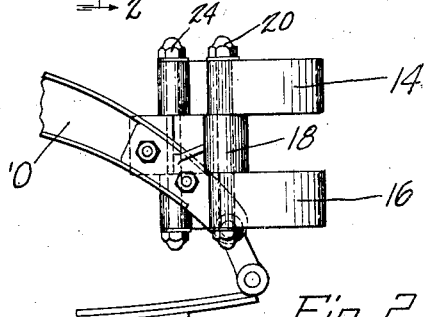
Fig. 2 is an elevation of one of the bumpers, from the point of view indicated by the line 2—2 of Fig. 1.
Figure 3:
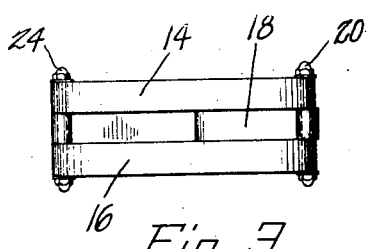
Fig. 3 is a rear elevation of one of the bumpers.

In the form shown in Figs. 1, 2, and 3, the invention is embodied in an automobile chassis having a chassis frame including side members 10 and side fenders 12 carried by the frame. Each fender is protected, without obstructing the center of the car, where the spare tire is usually arranged, by a quarter or wing bumper shown in plan in Fig. 1, in rear elevation in Fig. 3, and in side elevation in Fig. 2. Each quarter bumper comprises vertically-spaced impact bars 14 and 16, formed with eyes at both ends of each bar. At one end the eyes formed in the ends of bars 14 and 16 are arranged respectively above and below, and in vertical alinement with, an eye formed in a rigid bracket 18, which may be integral with the corresponding side frame member, but which is shown as securely bolted thereto to form a rigid continuation. A bolt 20 passing through the three alined eyes serves to fulcrum the impact bars on the bracket. The impact bars are arranged at their opposite ends with the eyes respectively above and below, and in vertical alinement with, an eye formed in the end of a resilient support 22 carried by side frame member 10, the three alined eyes being connected by a bolt 24.

Figure 4:
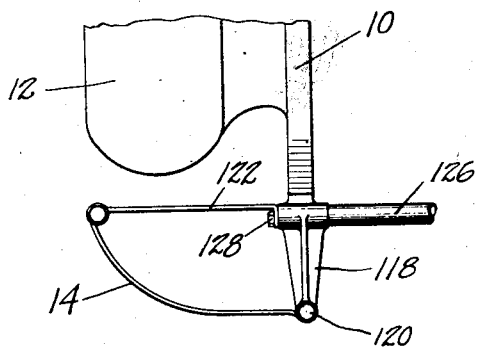
Fig. 4 is a plan view corresponding to part of Fig. 1 but showing a bumper of modified form.

The form shown in Fig. 4 differs from that described above, in that bracket 118 extends rearwardly to the point where it is connected by a bolt 120 to the impact bars, and in that the bracket also forms a socket for a cylindrical cross frame member 126 held by a nut 128 which also holds the resilient support 122.

Figure 5:
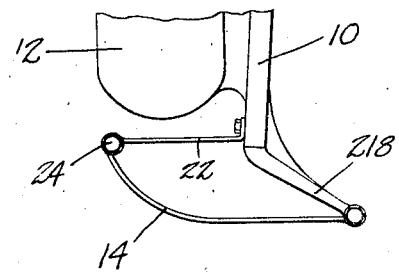
Fig. 5 is a similar view showing a different form of bumper.

The form shown in Fig. 5 differs from that shown in Figs. 1, 2, and 3 in that the rigid bracket 218 extends rearwardly as well as inwardly.

In all three forms, the rigid bracket and the resilient support of each quarter bumper form diverging arms supporting the impact bars, the impact bars fulcruming on the bracket when the resilient support yields.

While several illustrative embodiments of the invention have been described, it is not my intention to limit its scope to those embodiments, or otherwise than by the terms of the appended claims.

I claim:

1. A quarter bumper comprising, in combination, a rigid support, a resilient support, and vertically-spaced impact bars connected at opposite ends to said supports.

2. A vehicle comprising, in combination, a chassis frame and side fenders carried thereby, a rigid support secured to the frame at each side, a pair of resilient supports connected to the frame, each extending away from one of the rigid supports, and an impact member connected at opposite ends to each rigid support and the corresponding resilient support and held thereby in position to protect one of the side fenders.

3. A vehicle comprising, in combination, a chassis frame and side fenders carried thereby, a rigid support secured to the frame at each side, a pair of resilient supports connected to the frame, each extending away from one of the rigid supports, and vertically-spaced impact bars pivoted to each rigid support and the corresponding resilient support and held by said supports in position to protect one of the side fenders.

4. A vehicle comprising, in combination, a chassis frame having side members, a rigid bracket secured to the rear end of each side member, a resilient support carried by each side member and diverging from the corresponding bracket, and a pair of impact bars connected at one end to each bracket and at the other end to the corresponding resilient support.

5. A vehicle comprising, in combination, a chassis frame having side members, each side member being provided with a rigid continuation extending from its rear end at a sharp angle, a resilient support secured to each side member and diverging from the corresponding continuation, and an impact bar connected at opposite ends to each continuation and corresponding resilient support.

6. A vehicle comprising, in combination, a chassis frame having side members, each side member being provided with a rigid continuation extending from its rear end at a sharp angle, a resilient support secured to each side member and diverging from the corresponding continuation, each continuation and each resilient support being formed with an eye in its outer end, impact bars formed with eyes in their ends, and bolts passing through the eyes as described.

7. A vehicle comprising, in combination, a chassis frame having side members, each side member being provided with a rigid continuation extending from its rear end toward the center line of the frame, a resilient support secured to each side member and arranged to extend outwardly, and impact bars supported at their opposite ends by the resilient supports and by the rigid continuations.

8. A vehicle comprising, in combination, a chassis frame having side members, each side member being provided with a rigid continuation extending from its rear end toward the center line of the frame and formed with an eye at its free end, a resilient support secured to each side member and arranged to extend outwardly and formed with an eye at its free end, impact bars having eyes at their opposite ends, and bolts in said eyes connecting the impact bars to the resilient supports and to the rigid continuations.

9. A vehicle comprising, in combination, a chassis frame having side members, each side member being provided with a rigid continuation extending from its rear end toward the center line of the frame and being formed with an eye at its free end, a resilient support secured to each side member and arranged to extend outwardly and which is formed with an eye at its free end, two pairs of impact bars having eyes at their free ends, each pair being arranged with the eyes vertically above and below the eye of one of the rigid continuations at one end and above and below the eye of the corresponding resilient support at the other end, and bolts each passing through one of the sets of three eyes so brought into vertical alinement.

In testimony whereof I affix my signature.

LLOYD BLACKMORE.